United States Patent [19]

Jannke

[11] Patent Number: 4,688,315

[45] Date of Patent: Aug. 25, 1987

[54] SCREW EXTRACTOR AND METHOD OF USING SAME

[76] Inventor: Thomas E. Jannke, 22 Vinegar Hill Rd., Gales Ferry, Conn. 06335

[21] Appl. No.: 867,505

[22] Filed: May 28, 1986

[51] Int. Cl.[4] .......... B23P 19/02; B25B 13/50

[52] U.S. Cl. .......... 29/426.4; 29/426.5; 81/53.2; 408/204

[58] Field of Search .......... 29/426.4, 426.5; 81/53.2; 408/204

[56] References Cited

U.S. PATENT DOCUMENTS

| | | | |
|---|---|---|---|
| 221,692 | 11/1879 | Miller | 408/204 |
| 1,548,835 | 8/1925 | French | 29/426.5 X |
| 1,683,796 | 9/1928 | Pearce . | |
| 1,724,312 | 8/1929 | Pugh | 81/53.2 X |
| 1,848,590 | 3/1932 | Willis | 29/426.4 UX |
| 2,561,185 | 7/1951 | Drake | 408/204 |
| 2,684,526 | 7/1954 | Hoover | 29/426.5 |
| 2,752,671 | 7/1956 | Alyea | 29/426.4 |
| 2,897,585 | 8/1959 | Bodewein | 29/426.5 X |
| 3,106,233 | 10/1963 | Wolny | 29/426.5 X |
| 3,508,321 | 4/1970 | Wood | 29/426.4 |
| 3,654,690 | 4/1972 | Hardin | 29/426.4 |
| 3,910,139 | 10/1975 | Blaskovic | 81/53.2 |
| 4,078,458 | 3/1978 | Berendzen | 81/53.2 X |
| 4,204,308 | 5/1980 | Marling | 29/426.5 |
| 4,389,913 | 6/1983 | Drouin et al. | 81/53.2 |
| 4,426,896 | 1/1984 | Kesselman | 81/53.2 X |

*Primary Examiner*—Charlie T. Moon

[57] ABSTRACT

An extractor for removing a broken-off fragment of a threaded fastener has a tubular end portion with cutting teeth on its outer end, and with a longitudinal slit which defines marginal portions that are capable of relative displacement. The extractor can be used: (1) by cutting away the exterior portions of the embedded shaft piece, with the remaining part thereof spreading the marginal elements and causing the extractor to pass thereover, or (2) by boring axially into the fragment, ultimately causing the teeth to bite into the material thereof. In either case, interengaging forces will develop to exert an unscrewing effect upon the threaded piece, and the cutting elements of the tool are constructed to be effective when it is rotated in the direction of normal removal of the broken fastener.

20 Claims, 7 Drawing Figures

SCREW EXTRACTOR AND METHOD OF USING SAME

BACKGROUND OF THE INVENTION

It is not uncommon for threaded fasteners, such as wood screws, machine screws and bolts, to break or to otherwise become so damaged as to preclude them from being disassembled or removed by ordinary means from the part to which they are secured. The prior art has addressed this problem and has proposed a variety of solutions, as evidenced by the disclosures of the following U.S. patents:

In U.S. Pat. No. 1,548,835, French proposes a device for removing broken wood screws, which has internal cutting threads and an external cutting element, the internal threads being employed to create a new thread on the remaining stub to enable its extraction.

In U.S. Pat. No. 1,683,796, Pearce describes an extractor for broken taps, which has ribs with tapered teeth for cutting and for engaging the tap grooves.

The device disclosed in Willis U.S. Pat. No. 1,848,590 has two working portions, and is used in two steps for extracting broken fasteners; it is initially employed to cut a plug into the material in which the fastener is embedded, and then a noncircular part of the tool is used to break away the plug.

Wolney U.S. Pat. No. 3,106,233 provides a tubular member which is mounted upon the blade of a screwdriver for axial adjustment of its position; it has a cutting end portion which is used to cut away the material surrounding the screw, to thereby permit engagement by the blade of the screwdriver for effecting removal.

In U.S. Pat. No. 4,204,308, Marling provides a screw extracting device having axially extending gripping fingers; the fingers are driven into the material, and are thereafter tightened upon the screw to effect its extraction.

The screw extractor of Drouin et al. U.S. Pat. No. 4,389,913 has a tubular extension at one end, with axially projecting cutting teeth; upon achieving sufficient penetration, a chuck component of the device is tightened to cause the fingers to grip the screw and thereby permit its removal, which is done in the opposite direction to cutting.

Accordingly, it is an object of the present invention to provide a novel extractor for threaded fasteners, which is of relatively simple construction and is yet highly effective for its intended purpose.

It is a more specific object of the invention to provide such an extractor, which is constructed to expand over a broken-off piece of fastener and to frictionally engage it for removal.

Another specific object is to provide such a device which is also capable of cutting into the embedded fragment, and to then distort so as to create the frictional engagement necessary for removal.

Additional objects of the invention are to provide an extractor having the foregoing features and advantages, which is relatively facile and inexpensive to produce, and is highly convenient and easy to employ.

A further object of the invention is to provide a novel method for extracting broken-off portions of threaded fasteners, which is fast, effective and convenient.

SUMMARY OF THE DISCLOSURE

It has now been found that certain of the foregoing and related objects of the invention are readily attained by the provision of an extractor having a generally cylindrical, tubular end portion with cutting means on the outer end thereof. A longitudinal slit extends along the end portion of the member, and defines marginal edge elements which are displaceable relative to one another.

In preferred embodiments, the cutting means on the extractor will be made of a resilient metal, such as spring steel, and will be adapted to cut in one direction of rotation, that being the direction in which the fastener would normally be removed (generally counterclockwise). It will usually comprise a circumferential array of axially extending teeth, which will advantageously be internally bevelled, to provide a tapered entrance to the passage of the working end. A particularly desirable form of the extractor will comprise a uniform, generally tubular member having a longitudinal slit extending along its entire length, which slit will generally be rectilinear.

Other objects of the invention are achieved by the provision of a method for extracting the threaded fragments of fasteners, utilizing an extractor of the type described. The end portion of the extractor is aligned and brought into contact with the shaft portion fragment, and is rotated in the direction of normal removal in that relationship. The application of axial force will cause the cutting means of the extractor to cut into the fastener shaft portion, ultimately producing sufficient interengagement to effect removal.

Depending upon relative dimensions, the shaft portion of the fastener will distort the working end portion of the extractor either outwardly or inwardly. In the first case, the extractor will pass about the shaft portion, and the cutting means will advantageously be internally bevelled to promote outward camming action by the fastener fragment. If, on the other hand, the end portion is substantially smaller in diameter than the fastener, it will bore into it and will leave a cylindrical element intact, with forces that develop tending to distort the end portion so as to cause at least one of the teeth to bite into the material to establish the necessary interengagement.

DETAILED DESCRIPTION OF THE ILLUSTRATED EMBODIMENTS

Figure 1:
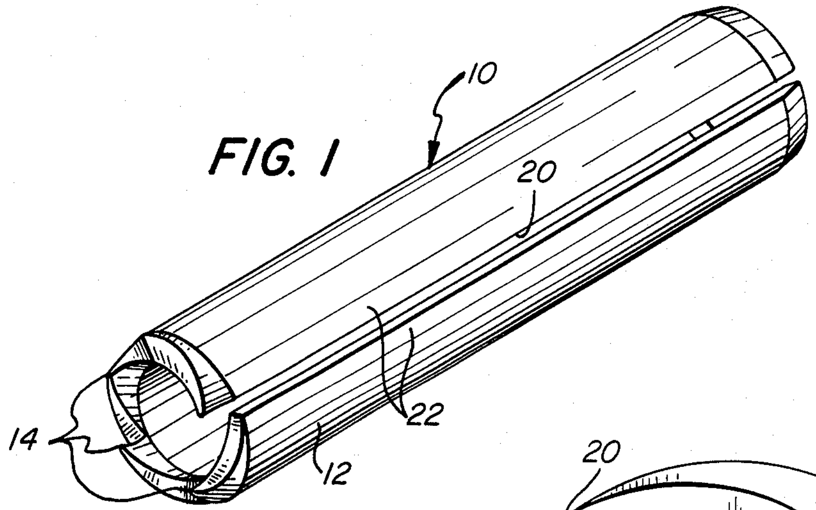
FIG. 1 is a perspective view of an extractor embodying the present invention.
Figure 2:
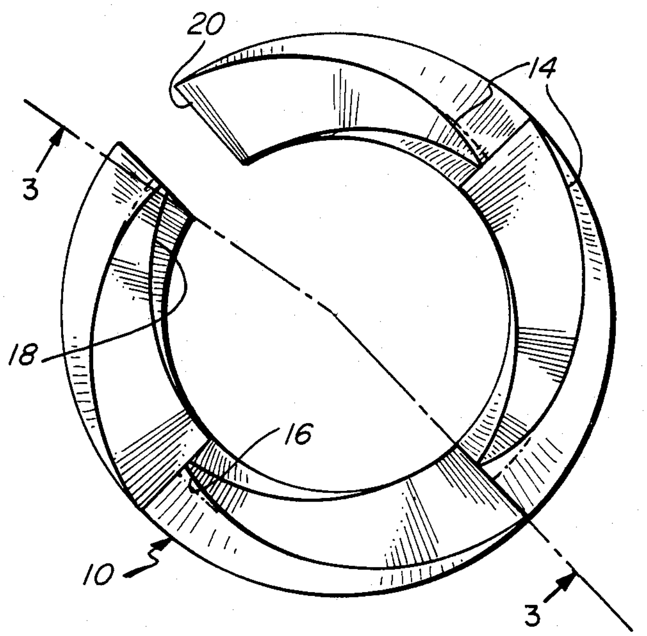
FIG. 2 is a view from the cutting end of the extractor of FIG. 1, drawn to an enlarged scale.
Figure 3:
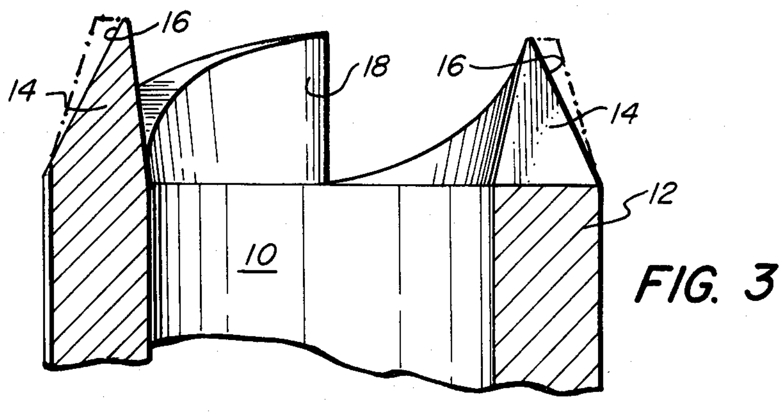
FIG. 3 is a fragmentary sectional view of the cutting end portion of the extractor, taken along line 3—3 of FIG. 2.

Turning now in detail to FIGS. 1–3 of the drawings, therein illustrated is an extractor embodying the present invention and consisting of a tubular member of cylindrical form, generally designated by the numeral 10. The working end portion 12 of the member 10 has a circumferential array of axially extending teeth 14 cut thereinto, the teeth 14 being formed to cut in a counterclockwise direction, and having an inside bevel and an outside bevel, as defined by surfaces 18 and 16, respectively. The member 10 has a rectilinear slit 20 extending axially along its entire length, which defines marginal edge portions 22.

Figure 5:
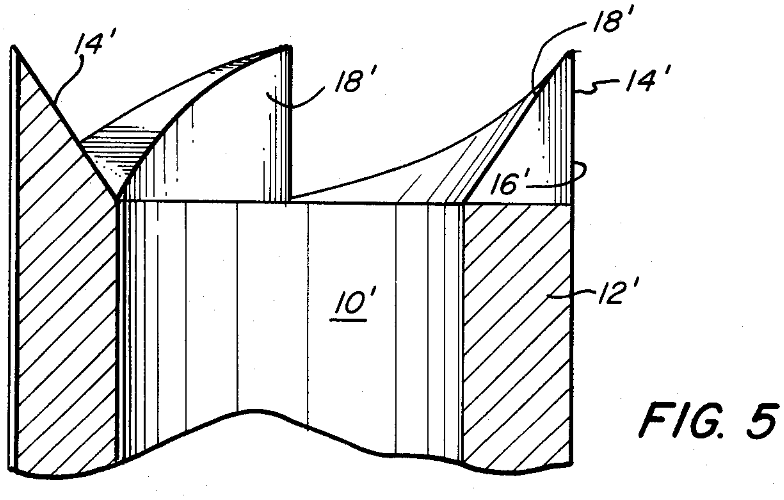
FIG. 5 is a view similar to that of FIG. 3, showing a modified form of extractors embodying the invention.

The working end portion 12' of a second embodiment of the extractors of the invention is shown in FIG. 5, and is generally designated by the numeral 10'. It is of virtually the same construction as the extractor illustrated in FIGS. 1–3, with the exception that only the inner faces 18' of the teeth 14' are bevelled, the outer faces 16' being of cylindrical form.

Figure 4:
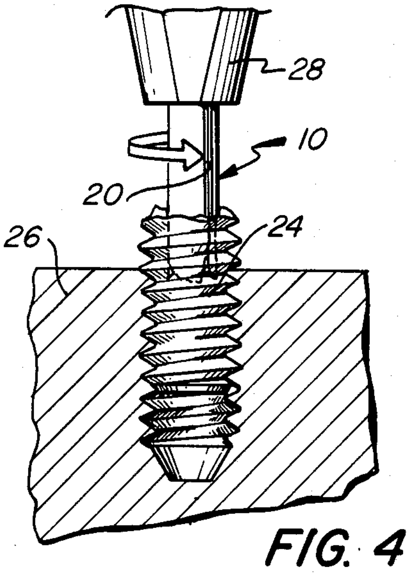
FIG. 4 is a fragmentary view showing use of the extractor, mounted in a chuck, to remove a machine screw from a body portion shown in section, the scale being reduced substantially from that of FIG. 1.
Figure 6:
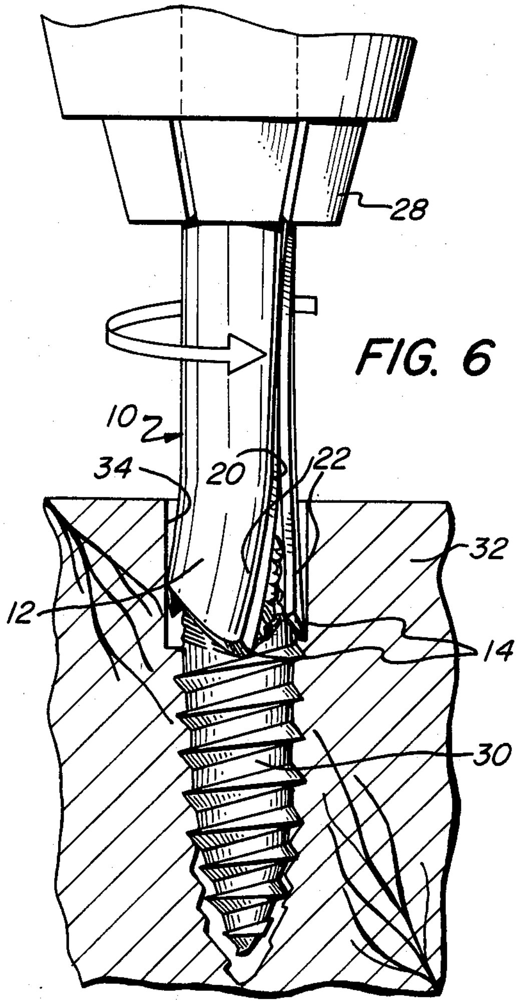
FIG. 6 is a fragmentary view showing use of the extractor expanded over the shaft portion of a wood screw to effect removal from a body shown in section, the scale being about the same as that of FIG. 1.
Figure 7:
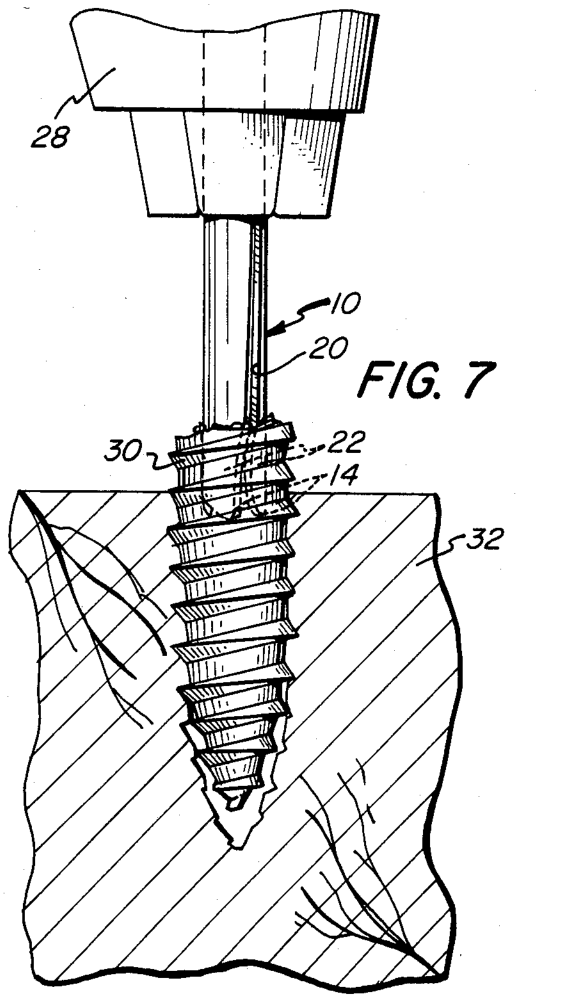
FIG. 7 is a view similar to FIG. 6, showing the use of an extractor of considerably smaller diameter to bore into, and thereby effect removal of, the screw.

FIGS. 4, 6 and 7 of the drawings illustrate use of the extractor (either of the two illustrated forms may be employed, and consequently in these Figures unprimed numbers will be used to designate both). As will be appreciated, the extractor 10 is secured within the chuck 28 of a suitable device, which may be an electric drill, a manually operated brace, or the like.

In FIG. 4, a machine screw shaft fragment 24 is shown partially removed from the body 26. To accomplish that, the extractor 10 has been rotated in a counterclockwise direction (as indicated by the arrow) in axial alignment with the fragment 24 and with the cutting teeth 14 forced against the exposed surface. Because of the manner in which the teeth 14 are formed, this will cause the extractor to bore into the fragment; one or more of the teeth will, at some point, catch and dig into the metal so that continued rotation in the same direction will effect unscrewing of the fragment from the body 26, as shown.

The technique depicted in FIG. 7 is substantially the same as that illustrated in FIG. 4, with the exception that the shaft portion 30 is a wood screw fragment, and the workpiece 32 is of wood. FIG. 7 also suggests the distortion that occurs between the marginal edge portions 22 of the extractor, under the frictional load that develops in the cutting action.

More particularly, the extractor undergoes a spiral distortion in which the mating edge portions 22 tend to shift longitudinally relative to one another; they will also tend to come together, although the uncut portion of the fastener may form a core within the tool which inhibits such action, particularly at its lower end. In any event, such relative shifting will cause the point of one of the teeth (normally the tooth that is adjacent the slit 20 and is trailing, in the direction of rotation) to project beyond the others and, being so exposed, to bite hard into the fastener fragment.

Turning finally to FIG. 6, an alternative (and in many instances preferred) way in which the extractor can be used for effecting the removal of broken screw portions is illustrated, which is especially well suited for use when the body in which the fragment is embedded is relatively soft (e.g., wood). In this instance, the extractor employed is considerably larger than that which would be used in the manner illustrated by FIGS. 4 and 7, relative to the diameter of the screw fragment. As can be seen, in most effectively applying the technique of FIG. 6 the inside diameter of the extractor employed is only slightly smaller than the maximum diameter of the fastener shaft. Consequently, during the cutting phase the thread of the fragment is removed while a bore 34 is formed into the wooden body.

As the extractor is forced more deeply into the workpiece, the screw fragment exerts an outward force upon the bevelled surfaces 18 of the cutting teeth 14, camming them apart and thereby producing a spreading of the marginal edge portions 22; the relative softness of the wood permits this to occur readily. Ultimately, the frictional forces that are developed will cause the inside surfaces of the extractor end portion 12 to bind upon the shaft portion 30, and will in turn cause the extractor to effect removal of the fragment during further rotation in the same direction. This assumes of course that the gripping force is sufficient to overcome the forces resisting removal, and the inside surface of the tool may be modified if so desired to enhance the level of frictional interengagement produced.

Although not illustrated, it will be appreciated that the tool of the invention can be employed in a third way, as well. By utilizing an extractor that is of considerably larger diameter than the fragment to be withdrawn, it will simply cut a plug surrounding the embedded piece, which ultimately can be removed from the work by any suitable means. As pointed out above, the cutting and subsequent removal of such plugs is a technique that has been disclosed in the art; however, the devices used are structurally entirely different from the extractors of the present invention, and would not offer similar functional capabilities.

As yet another possibility, the extractor may be used simply to cut out the center of the fastener fragment, leaving only the threads (which can thereafter be readily removed), or to provide a bore within which an "easy-out" can be engaged to effect removal. These techniques may be particularly useful when the fragment is especially difficult to remove, such as may be due to the presence of extreme levels of corrosion.

Although suitable alternatives for manufacture may occur to those skilled in the art, the instant extractors may most economically be produced by rolling or otherwise forming a piece of thin flat metal, such as spring steel, into the tubular cylindrical shape illustrated. Thereafter, the saw teeth may be cut thereinto, and the desired bevel or bevels formed thereon.

It is essential to note that the edges defining the seam or slit of the tube are not joined to one another, at least along the working end portion of the extractor. As explained above, the marginal edge portions must be free to move relative to one another for expansion, contraction and/or axial shifting, depending upon the manner in which the tool is employed. Although it may be desirable in some instances to either partially join the edges, or to form a slot along only the working end portion, the most facile means of producing the extractor will normally result in a slit along the entire length of the member; as will be appreciated, both ends of the tool may be provided with cutting teeth to render them capable of functioning for the extraction of a fragment, and in that case a continuous slit will be advantageous. Also, while a single slit is illustrated, it may be desirable in some instances to provide a plurality of slot portions communicating with the cutting member, such as when the tool is fabricated from a highly rigid and non-yielding material; normally however, the material will have a high degree of resiliency. In addition, rather than being rectilinear and aligned on the axis of the member, the slit may extend at an angle to the axis or it may proceed along a somewhat helical path thereabout; such modifications may indeed be advantageous, as to promote the deformation of the working end portion described.

It is a particularly notable feature of the extractor that the cutting means thereof operates in the direction in which removal of the threaded fastener portion would normally be effected; in most cases, this means that the teeth will be formed to cut when rotated in the counterclockwise direction, although they may be formed to cut in the opposite direction, to effect the extraction of left-hand drive machine screws. As a result, extraction can usually be achieved in a virtually continuous action.

It will be noted that an alternative tooth formation has been indicated by the phantom line representations of FIGS. 2 and 3. To enhance strength and durability, the teeth may be less pointed than shown in full line, and the widening of the tips in the manner shown (which would of course normally apply to all teeth, if adopted) may be preferred in many instances. Furthermore, although not illustrated it might be pointed out that the axially extending cutting faces of the teeth may be raked backwardly, to provide an undercut for each of them, as may further improve the cutting action of the tool.

Thus, it can be seen that the present invention provides a novel extractor for threaded fasteners, which is of relatively simple construction, is relatively facile and inexpensive to produce, is convenient and easy to employ, and is highly effective for its intended purpose. More specifically, the invention provides an extractor which is constructed to either expand over a broken-off piece of fastener and to frictionally engage it to effect its removal, of to cut into the embedded fragment and then to distort so as to create the engagement necessary for removal. The invention also provides a novel method for extracting broken-off portions of threaded fasteners, which is fast, effective, and convenient.

Having thus described the invention, what is claimed is:

1. An extractor for a threaded fastener having a shaft portion, comprising a member having a generally cylindrical, tubular end portion with cutting means on the outer end thereof, said end portion having a longitudinal slit extending therealong from said outer end to define marginal edge elements which are displaceable relative to one another whereby said extractor may be used to extract a threaded fastener shaft portion having a maximum outside diameter at least slightly larger than the inside diameter of said end portion by cutting axially into the shaft portion, with at least one of said marginal edge elements of said end portion thereby being displaced radially to produce an enhanced grip upon the shaft portion of the fastener.

2. The extractor of claim 1 wherein said cutting means is adapted to cut in one direction of rotation, said direction being that in which the fastener for which said extractor is intended is normally removed.

3. The extractor of claim 2 wherein said cutting means comprises a circumferential array of axially extending teeth.

4. The extractor of claim 3 wherein said direction is counterclockwise.

5. The extractor of claim 1 wherein said outer end of said end portion is internally bevelled to provide a tapered entrance to the passage of said end portion.

6. The extractor of claim 5 wherein said outer end is externally bevelled.

7. The extractor of claim 1 wherein said member is of a uniform, generally cylindrical tubular configuration.

8. The extractor of claim 7 wherein said longitudinal slit extends along the entire length of said member.

9. The extractor of claim 8 wherein said slit is rectilinear.

10. The extractor of claim 1 wherein said member is fabricated from spring steel, and wherein said marginal edge elements are resiliently displaceable.

11. An extractor for a threaded fastener having a shaft portion, comprising a generally cylindrical tubular member having an end portion with cutting means on the outer end thereof, and having a longitudinal slit extending along a substantial part of the length of said end portion from said outer end to define marginal edge elements which are resiliently displaceable relative to one another, said cutting means comprising an array of axially extending teeth adapted to cut in one direction of rotation and formed with an internal bevel to provide a tapered entrance to the passage of said member.

whereby said extractor may be used to extract a threaded fastener shaft portion having a maximum outside diameter at least slightly larger than the inside diameter of said end portion by cutting axially into the shaft portion, with at least one of said marginal edge elements of said end portion thereby being displaced radially to produce an enhanced grip upon the shaft portion of the fastener.

12. The extractor of claim 11 wherein said direction is counterclockwise.

13. The extractor of claim 11 wherein said longitudinal slit extends along the entire length of said member.

14. The extractor of claim 13 wherein said slit is rectilinear.

15. The extractor of claim 11 wherein said member is fabricated from spring steel.

16. In a method for effecting the extraction of a threaded fastener shaft portion from a body, the steps including:

providing an extractor comprised of a member having a generally cylindrical, tubular end portion with cutting means on the outer end thereof, said end portion having a longitudinal slit extending therealong from said outer end to define marginal edge elements which are displaceable relative to one another, the inside diameter of said end portion being at least slightly smaller than the maximum outside diameter of the threaded shaft portion to be extracted, and said cutting means being adapted to cut in the direction in which said shaft portion would normally be removed;

bringing said extractor end portion into substantial coaxial alignment with said shaft portion; and rotating said extractor in said direction of normal removal in contact with said shaft portion while applying axial force thereto, to cause said cutting means to cut axially into said shaft portion, with at least one of said marginal elements thereby being displaced radially to produce an enhanced grip of said end portion upon said fastener shaft portion.

17. The method of claim 16 wherein said end portion of said extractor is configured and dimensioned, relative to said shaft portion, to be expanded thereby and to pass outwardly thereabout during said cutting step, with the frictional forces developed thereby tending to cause said extractor to bind upon and thereby to unthread said shaft portion from said body.

18. The method of claim 17 wherein said cutting means of said extractor is internally bevelled to promote outward camming action of said shaft portion thereupon.

19. The method of claim 16 wherein said end portion of said extractor is of a diameter substantially smaller than said fastener shaft portion so as to cut thereinto while leaving intact an element of said shaft portion thereabout, and wherein forces developed therebetween will tend to distort said extractor end portion and to cause said cutting means to bite into the material of said shaft portion, and thereby to cause said extr actor to unthread said shaft portion from said body.

20. The method of claim 19 wherein said cutting means comprises a circular array of axially extending teeth.

* * * * *